United States Patent
Holman et al.

[11] Patent Number: 6,003,111
[45] Date of Patent: Dec. 14, 1999

[54] BANK STATE TRACKING METHOD AND DEVICE

[75] Inventors: Thomas J. Holman; Andrew V. Anderson, both of Portland, Oreg.

[73] Assignee: Intel Corporation, Santa Clara, Calif.

[21] Appl. No.: 08/974,320

[22] Filed: Nov. 19, 1997

[51] Int. Cl.[6] .................................................. G06F 12/00
[52] U.S. Cl. ................................................. 711/5; 711/156
[58] Field of Search ........................................ 711/156, 5

[56] References Cited

U.S. PATENT DOCUMENTS

5,774,409  6/1998  Yamazaki et al. .................. 365/230.03

Primary Examiner—Reginald G. Bragdon
Attorney, Agent, or Firm—Blakely, Sokoloff, Taylor & Zafman LLP

[57] ABSTRACT

A mechanism for tracking the state of a plurality of memory banks in a memory device includes a register which has a plurality of bits, with each bit corresponding to one of the memory banks in the memory device. An open bank circuit has an output coupled to the register and is responsive to both a bank select signal which identifies a first memory bank and an open signal, to set a register bit associated with the first memory bank. A close bank circuit has an output coupled to the register and is responsive to the bank select signal which identifies a second memory bank as well as a close signal to reset the register bit associated with the second memory bank and any banks adjacent to the second memory bank.

30 Claims, 5 Drawing Sheets

FIG. 1

(PRIOR ART)

BANK STATE TRACKING METHOD AND DEVICE

BACKGROUND OF THE INVENTION

1. Field of the Invention

The invention relates generally to computer memory device controllers, and more specifically, to a device and method for tracking the bank state of a memory device.

2. Description of Related Art

Computer main memory typically comprises a group of memory devices, such as dynamic random access memory (DRAM) devices, which include several banks of data storage cells arranged in arrays of rows and columns. A memory controller works in conjunction with the memory devices to read and write data to the memory device and perform other memory device control tasks, such as memory refresh. To access the memory locations, the memory controller provides an address signal that identifies a specific memory device, a bank within the device, and a row and column address within the bank.

Figure 1:
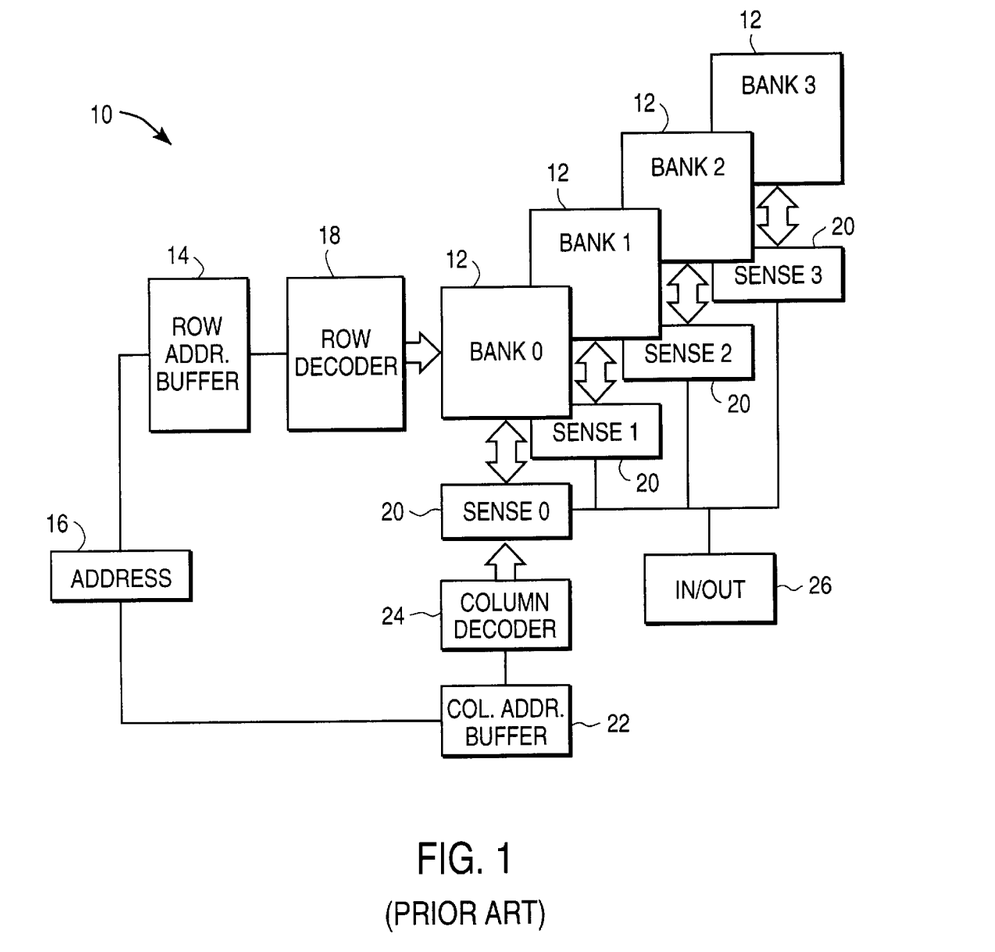
FIG. 1 illustrates a simplified block diagram of a prior art memory device having an independent bank structure.

FIG. 1 illustrates a simplified block diagram of a prior art memory device 10, which includes four memory banks 12. Each memory bank 12 includes data storage cells arranged in rows and columns (not shown). A row address buffer 14 holds a row address portion of a memory address received via address input terminals 16. A row decoder 18 decodes an output of the row address buffer 14 to select a row of data from the identified memory bank 12. A bank of sense amplifiers 20 stores and amplifies data from the row selected from the memory bank 12 by the row decoder 18, as row data for one page. A column address buffer 22 stores a column address received through the address input terminals 16, and transfers the column address to a column decoder 24, which selects data corresponding to the designated column from page data stored in the sense amplifiers 20 associated with the designated memory bank 12. A data input/output circuit 26 reads the selected data from the sense amplifiers 20 associated with the selected memory bank 12, or provides data to the sense amplifiers 20 to be written to the selected memory bank 12.

When data are held in the sense amplifiers 20 associated with the selected memory bank 12, the bank 12 is considered "open." When no data are held in the sense amplifiers 20, the bank 12 is considered "closed." When the data read or write is complete, the memory bank 12 may be closed, until it is selected for another read or write. Conventional memory devices, such as that illustrated in FIG. 1, have a bank of sense amplifiers 20 for each memory bank 12 in the memory device 10. This is considered an "independent" bank structure, since individual memory banks may be operated independent of the other memory banks within the memory device.

SUMMARY OF THE INVENTION

In one aspect of the present invention, a mechanism for tracking the state of a plurality of memory banks in a memory device includes a register with a plurality of bits. Each bit corresponds to one of the memory banks in the memory device. An open bank circuit has an output coupled to the register and is responsive to a bank select signal identifying a first memory bank and an open signal to set a register bit associated with the first memory bank. A close bank circuit has an output coupled to the register and is responsive to the bank select signal identifying a second memory bank and a close signal to reset the register bit associated with the second memory bank and any banks adjacent to the second memory bank.

In a further aspect of the invention, a method for tracking the state of a plurality of memory banks in a memory device includes setting a first bit in a register associated with a first one of the memory banks when the first memory bank is opened, and also designating any memory banks adjacent to the first memory bank as open. Another aspect of the invention further includes indicating whether any memory banks are open.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As discussed in the Background of the Invention section, conventional memory devices, such as that illustrated in FIG. 1, have an "independent" bank structure, since individual memory banks may be operated independent of the other memory banks within the memory device. Other memory device organizations are envisioned wherein adjacent memory banks may share a portion of the sense amplifiers, rather than providing a bank of sense amplifiers for each memory bank. This is a "dependent" organization, since operation of a given memory bank is dependent on other memory banks. For example, if memory bank n is using the sense amplifiers (data from memory bank n is being held in the sense amplifiers), banks n−1 and n+1 cannot use the sense amplifiers. Hence, when bank n is open, banks n−1 and n+1 are "locked." In this arrangement, banks n−1, n, and n+1 constitute a "bankset."

Hybrid dependency arrangements are also possible, wherein some memory banks are independent and some are dependent. For example, in a memory device having four memory banks 0–3, banks 0 and 1 may share a set of sense amplifiers, and banks 2 and 3 may share another set of sense amplifiers. Thus, banks 0 and 1 are dependent on each other, as are banks 2 and 3. Banks 1 and 2, however, are not dependent on each other. Hence, in this hybrid memory bank arrangement, bank 1 and adjacent bank 2 may be open simultaneously. Typically, when a memory device organized in a dependent manner receives a command to close a memory bank, any banks dependent on the selected memory bank are also closed. Memory device configurations may also exist that require a separate close command for each open bank.

Figure 2:
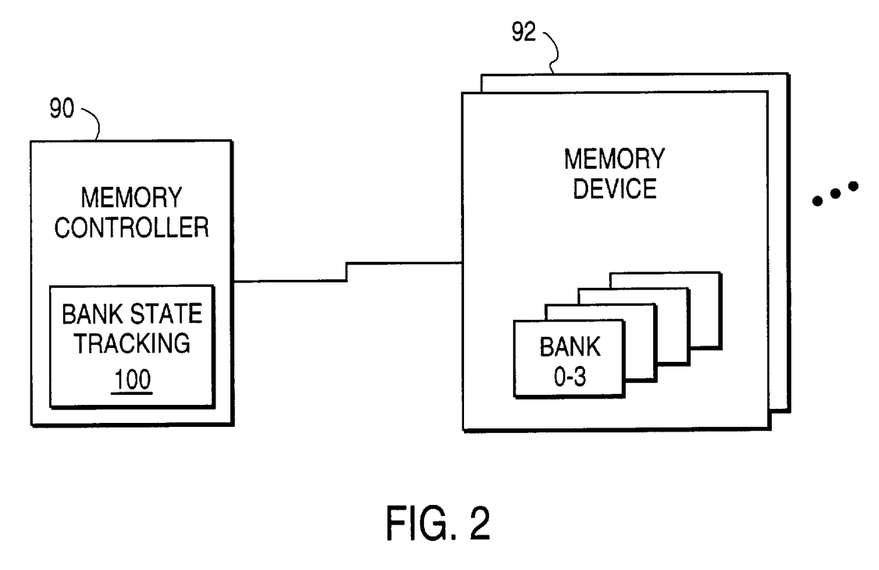
FIG. 2 is a block diagram of an exemplary implementation of a bank state tracking mechanism in accordance with an embodiment of the invention.

FIG. 2 illustrates an exemplary application of a bank state tracking mechanism 100 in accordance with an embodiment of the invention. The bank state tracking mechanism 100 may be a component of a memory controller 90, which is coupled to one or more memory devices 92, each having a plurality of memory banks. Further, each memory device 92 may comprise multiple memory devices. The exemplary memory device 92 illustrated in FIG. 2 includes four memory banks 0–3, though the present invention may be embodied in conjunction with memory devices having any number of memory banks.

As discussed above, if a memory device 92, such as a DRAM, has memory banks arranged in a fully dependent manner, adjacent memory banks share a portion of the memory device's sense amplifiers. Thus, when a given bank, bank n, is using the sense amplifiers, banks n−1 and n+1 cannot use the sense amplifiers. Therefore, when bank n is open (the sense amplifiers of bank n contain valid data), banks n−1 and n+1 are "locked." The present invention provides a means to track the state of memory banks in either a conventional memory device having an independent bank structure, a memory device with its memory banks arranged in a dependent manner, or a memory device having its memory banks arranged in a hybrid structure, such that the memory device 92 can be properly controlled.

Figure 3:
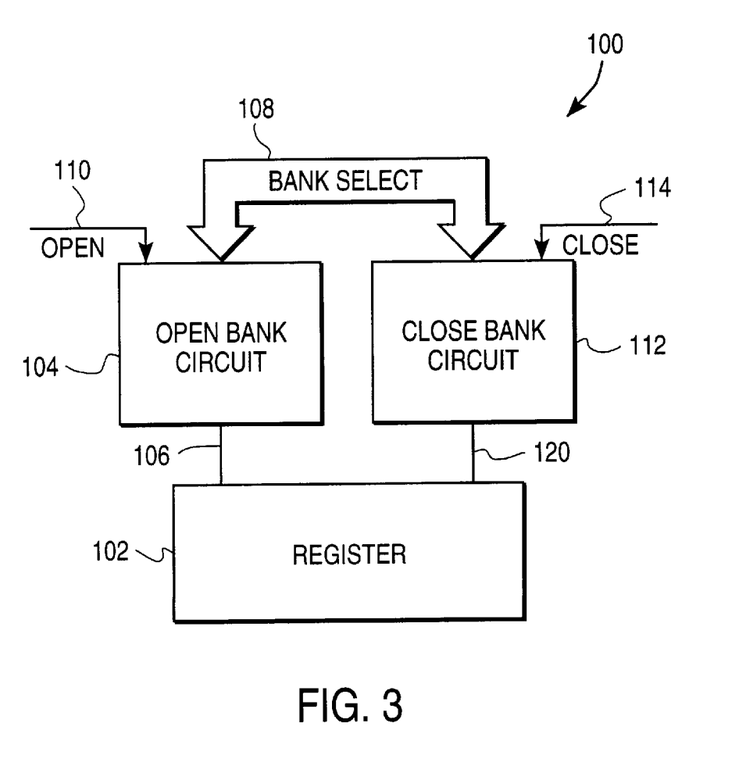
FIG. 3 illustrates a simplified block diagram of a device in accordance with an embodiment of the present invention for tracking memory bank state.

Turning to FIG. 3, a block diagram of an embodiment of a bank state tracking mechanism 100 in accordance with the invention is illustrated. The bank state tracking mechanism 100 includes a bank state bit register 102 for storing the identification of any open memory banks 0–3 in the memory device 92. An open bank circuit 104 includes an output terminal 106 coupled to the bank state bit register 102. The open bank circuit 104 receives a bank select signal 108, which identifies one of the memory banks 0–3 of the memory device 92, and an open signal 110. A close bank circuit 112 is also coupled to the register 102. The close bank circuit 112 receives the bank select signal 108 and a close signal 114. Indications of memory banks 0–3 identified by the bank select signal 108 are stored or cleared from the register 102 by the open and close bank circuits 104, 112, thus providing the memory controller 90 the data necessary to properly control the memory device 92.

Figure 4:
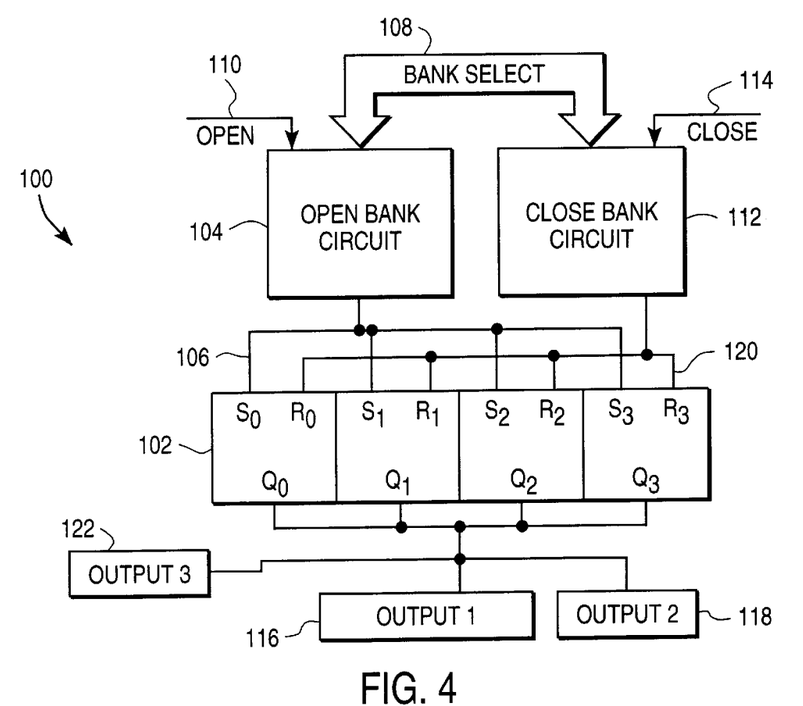
FIG. 4 illustrates another embodiment of a device in accordance with an embodiment of the present invention for tracking memory bank state.

In FIG. 4, a block diagram of the exemplary bank state tracking mechanism 100 illustrated in FIG. 3 is shown with additional elements. The bank state register 102 is includes a plurality of bit storage devices corresponding to each memory bank of the memory device 92. In the illustrated embodiment, the bit storage devices are constructed from R-S flip-flops, though other storage devices may be used for storing the indications of open memory banks. FIG. 4 illustrates the bank state tracking mechanism 100 as it would be implemented for an exemplary memory device 92 having four memory banks 0–3 arranged in a fully dependent manner, wherein each of the memory banks 0–3 share sense amplifiers with any adjacent memory banks. The present invention, however, may be applied to memory devices having any number of memory banks in dependent, independent, or hybrid arrangements by one skilled in the art having the benefit of this disclosure.

Thus, the bank state bit register 102 includes four bits $Q_0$–$Q_3$ corresponding to the four memory banks 0–3. The bank state register 102 includes set inputs $S_0$–$S_3$ and reset inputs $R_0$–$R_3$ corresponding to each of the register bits $Q_0$–$Q_3$, respectively. As shown in FIG. 4, the bank state tracking mechanism 100 may further include first, and second output circuits 116, 118 coupled to the register 102. The bank select signal 108 is received by both the open bank circuit 104 and the close bank circuit 112. The output terminals 106 of the open bank circuit 104 are coupled to the set inputs $S_0$–$S_3$, and the output terminals 120 of the close bank circuit 112 are coupled to the reset inputs $R_0$–$R_3$ for setting and resetting the register bits $Q_0$–$Q_3$. The embodiment of the bank state tracking mechanism 100 may further include a third output circuit 122 coupled to the bank state register 102.

When the bank select signal 108 is applied to the open bank circuit 104 and the open signal 110 is asserted, the register bit $Q_0$–$Q_3$ corresponding to the memory bank 0–3 identified by the bank select signal 108 is set. This latches the identity of the open memory bank 0–3 in the register 102. The first output circuit 116 delivers a signal that identifies any open or locked memory banks 0–3 based on the set register bits $Q_0$–$Q_3$. The second output circuit 118 identifies whether any of the memory banks 0–3 in the memory device 92 are open.

The close bank circuit 112 asserts the reset input $R_0$–$R_3$ to reset the register bit $Q_0$–$Q_3$ corresponding to a memory bank 0–3 to be closed as identified by the bank select signal 108 when the close signal 114 is asserted. However, the close bank circuit 112 is further arranged to assert the reset input $R_0$–$R_3$ corresponding to any register bits $Q_0$–$Q_3$ adjacent the identified bit, thereby ensuring that all of the register bits $Q_0$–$Q_3$ associated with the memory banks 0–3 in the bankset are reset. In other words, if the bank select signal 108 identifies bank n to be closed, the bit associated with bank n, as well as the bits associated with banks n−1 and n+1 are reset.

The bank state tracking mechanism 100 may further include a third output circuit 122 coupled to the bank state register 102 for providing additional bank state information. In an embodiment of the invention, the third output circuit 122 provides the identification of an open bank and an indication of whether the bank identification is valid.

Figure 5:
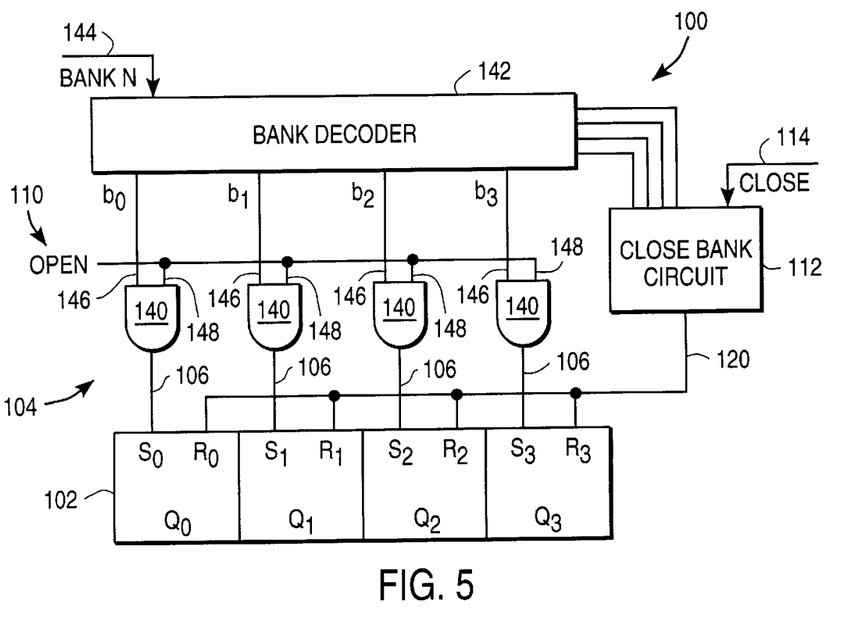
FIG. 5 illustrates an exemplary embodiment of an open bank circuit in accordance with an embodiment of the invention.

A circuit diagram of a specific embodiment of the open bank circuit 104 of the bank state tracking mechanism 100 is illustrated in FIG. 5. The open bank circuit 104 comprises a plurality of logic devices 140 corresponding to the memory device 92 memory banks 0–3. In the exemplary embodiment illustrated in FIG. 5, the logic devices are AND gates 140. A bank decoder 142 receives an indication of the identity of a memory bank n (reference number 144) and outputs a bank select signal $b_0$–$b_3$ corresponding to each of the memory banks 0–3. The bank select signal $b_0$–$b_3$ is logically high if the bank is selected, and logically low if the bank is not selected. Each of the AND gates 140 has one input 146 coupled to its respective bank select signal $b_0$–$b_3$ and the other input 148 coupled to the open signal 110. The outputs 106 of the AND gates 140 are coupled to the register set inputs $S_0$–$S_3$ for each bit $Q_0$–$Q_3$ of the register 102.

Thus, when a given bank select signal $b_0$–$b_3$ goes high, indicating that its corresponding memory bank 0–3 has been selected, and the open signal 110 is asserted indicating that the selected bank is to be opened, the output 106 of the respective AND gate 140 will go high, asserting the proper set input $S_0$–$S_3$ and thereby setting the proper bit $Q_0$–$Q_3$ in the register 102. For example, if the memory bank 0 is to be opened, the bank select signal $b_0$ will be logically high, as will be the open signal 110, providing high input signals 146, 148 to the AND gate 140 coupled to the set input $S_0$ associated with the register bit $Q_0$. Therefore, the set input $S_0$ receives a logically high signal and sets the register bit $Q_0$ to indicate that the memory bank 0 is open.

Figure 6:
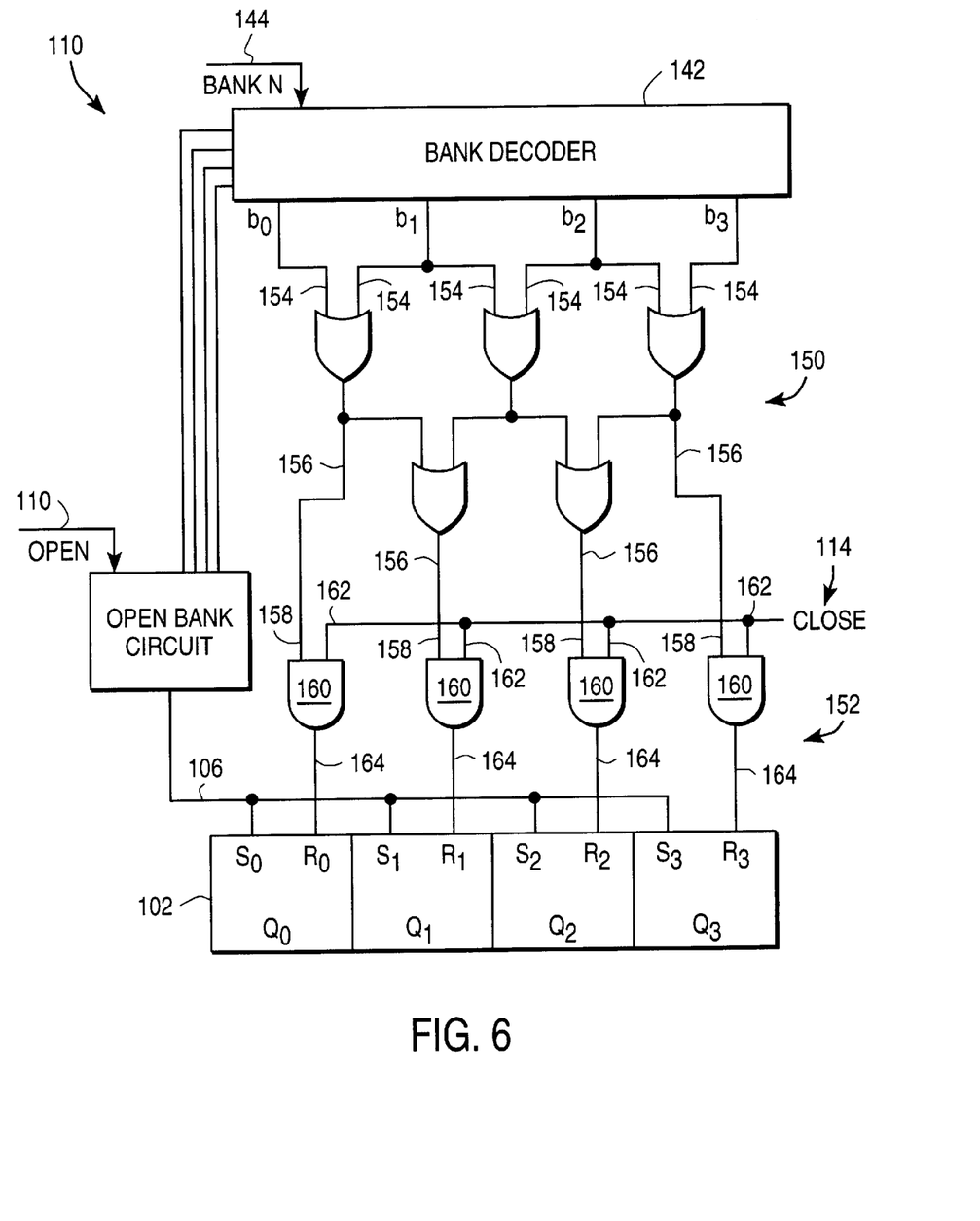
FIG. 6 illustrates an exemplary embodiment of a close bank circuit in accordance with an embodiment of the invention.

An embodiment of the close bank circuit 112 in accordance with the invention is illustrated in FIG. 6. The exemplary close bank circuit 112 includes first and second logic circuits 150, 152. The first logic circuit 150 in the embodiment of FIG. 6 is comprised of a plurality of OR gates that receive the bank select signals $b_0$–$b_3$ as input signals. The output terminals 156 of the first logic circuit 150 are coupled to input terminals 158 of the second logic circuit 152, which in the embodiment illustrated in FIG. 6, comprise an AND gate 160 corresponding to each memory bank 0–3 of the memory device 92. Each AND gate 160 in the close bank circuit 112 is coupled to receive a signal from the output terminal 156 of the first logic circuit 150 as one input terminal 158, and the close signal 114 as a second input terminal 162. The AND gate output terminals 164 are coupled to the reset inputs $R_0$–$R_3$ of the bank state register 102.

The first logic circuit 150 is arranged such that when a given bank is selected and the corresponding bank state signal $b_0$–$b_3$ goes high, the respective AND gate 160 receives a high signal at the input terminal 158. In addition, the first logic circuit 150 is arranged so that the AND gates 160 corresponding to the banks adjacent the given bank also receive a high signal at the input terminal 158. When the close signal 114 is asserted, signifying that the selected bank is closed, the AND gates 160 associated with the given bank and the banks adjacent thereto each receive two high signals at the input terminals 158, 162 and therefore, provide logically high signals at the output terminals 164. Thus, the reset inputs $R_0$–$R_3$ associated with the given bank and the adjacent banks each receive a logically high signal and reset the respective register bit $Q_0$–$Q_3$.

If the bank state tracking mechanism 100 is implemented with a memory device that requires a separate close command for each open bank, the close bank circuit 112 may be altered such that only the reset input $R_0$–$R_3$ associated with the bank 0–3 identified by the bank select signal $b_0$–$b_3$ is asserted. This could be accomplished, for example, by is bypassing the first logic circuit 112. The bank select signals $b_0$–$b_3$ may be coupled directly to the AND gates 160 associated with their respective reset inputs $R_0$–$R_3$ in place of the outputs 156 of the first logic circuit 150. Alternately, each of the AND gates 160 may be replaced by a multiplexer configured to receive the bank select signal $b_0$–$b_3$, the appropriate output 156 of the first logic circuit 150, the close signal 114, and a "close-type" indication that identifies whether only the reset input $R_0$–$R_3$ associated with the bank 0–3 identified by the bank select signal $b_0$–$b_3$ is to be asserted, or that the selected bank 0–3 reset input $R_0$–$R_3$ and any adjacent reset inputs $R_0$–$R_3$ are to be associated. Modifications such as these to the close bank circuit 112 would be a routine undertaking to one skilled in the art having the benefit of this disclosure.

Figure 7:
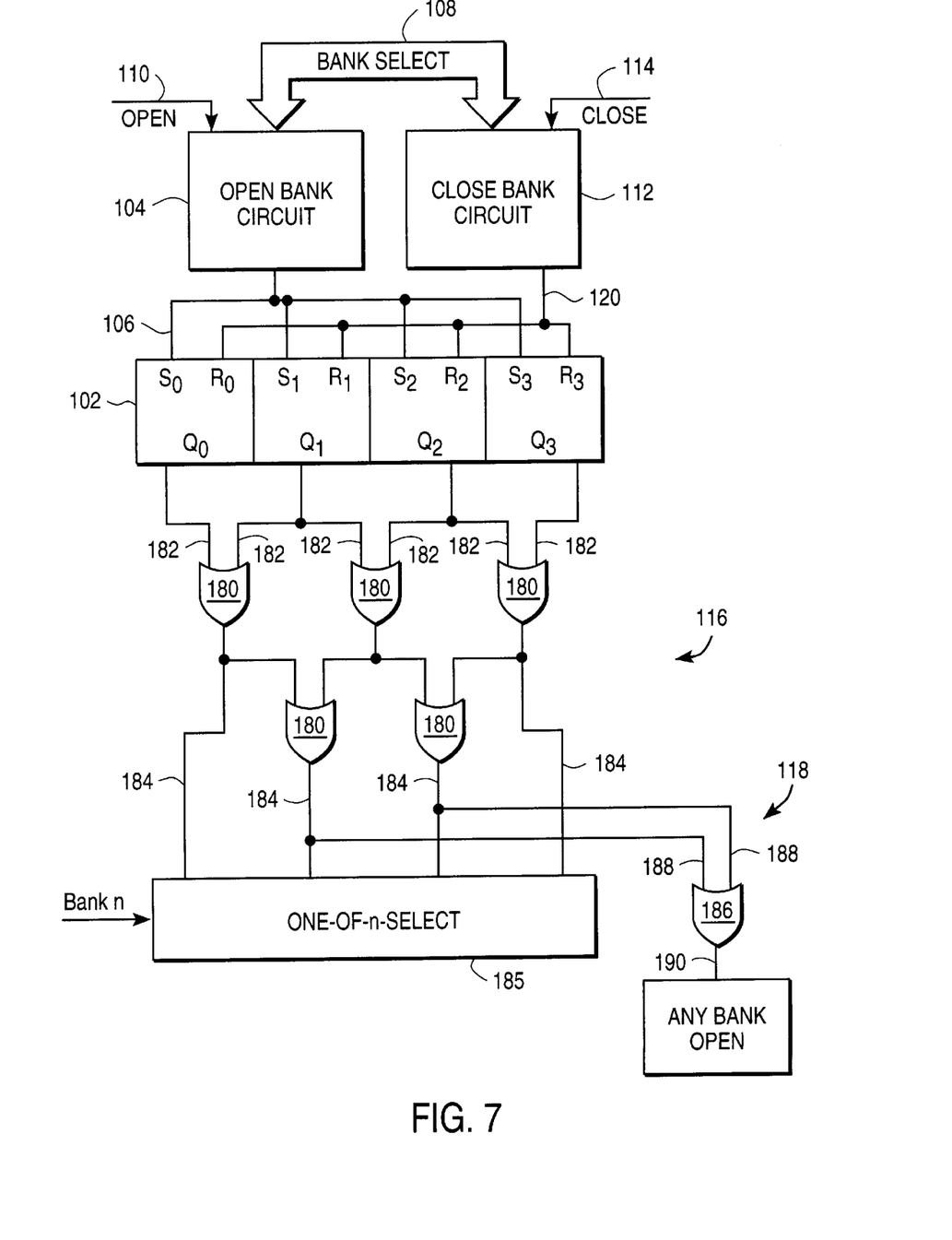
FIG. 7 illustrates exemplary embodiments of first and second output circuits in accordance with an embodiment of the invention.

FIG. 7 illustrates the exemplary bank state tracking mechanism 100 in further detail, including embodiments of the output circuits 116, 118. The first output circuit 116 comprises a plurality of OR gates 180 which have input terminals 182 coupled to the register bits $Q_0$–$Q_3$. The OR gates 180 are arranged to output a signal on output terminals 184, which identify any open memory banks 0–3, as well as any memory banks adjacent an open bank. Thus, the bank state tracking mechanism 100 designates any open bank and any bank adjacent an open bank (a bankset) as being open. The exemplary embodiment of the invention illustrated in FIG. 7 further includes a one-of-n select circuit 185 coupled to the output terminals 184 of the first output circuit 116. The one-of-n select circuit 185 is arranged to receive an indication of a bank n and test the open status of that specific bank. The one-of-n select compares the received bank n indication and compares it to the output 184 of the first output circuit 116 and provides an indication of the status of bank n.

The second output circuit 118 comprises an OR gate 186 having two input terminals 188 coupled to two of the output terminals 184 of the first output circuit 116 in a manner such that when any of the register bits $Q_0$–$Q_3$ are set, the OR gate 186 receives at least one high signal at the input terminals 188. Hence, the second output circuit 118 provides a logically high signal at an output terminal 190 if any register bit $Q_0$–$Q_3$ associated with an open bank 0–3 is set, and a logically low signal at the output 190 if no memory banks 0–3 are open.

By way of example, the sequence of events shown in Table 1 below in conjunction with FIG. 3–FIG. 7 illustrate the operation of an embodiment of the bank state tracking mechanism 100 in accordance with the invention:

| Event | Action | Register | First Output | Second Output | Third Output (valid, id) |
|---|---|---|---|---|---|
| 1 | Initial state | 0000 | 0000 | 0 | 0, 00 |
| 2 | Open bank 0 | 1000 | 1100 | 1 | 1, 00 |
| 3 | Open bank 2 | 1010 | 1111 | 1 | 1, 00 |
| 4 | Close bank 1 | 0000 | 0000 | 0 | 0, 00 |

Event 1 is the initial state, wherein all of the memory banks 0–3 in the memory device 92 are closed. The third output circuit 122 validity bit (left-most bit) is a "0", indicating that the "00" bank address in the next two bits is invalid, since all banks are closed.

In Event 2, memory bank 0 is opened. The bank select signal $b_0$ and the open signal 110 are logically high, so the AND gate 140 coupled to the set input $S_0$ outputs a logically high signal to set the register bit $Q_0$ for memory bank 0. In response to the logically high register bit $Q_0$, the first output circuit 116 indicates that both bank 0 and bank 1 (adjacent to bank 0), are open. The second output circuit 118 outputs a logically high signal indicating that a bank is open. The third output circuit 122 validity bit indicates a valid bank address, bank 00, is open.

Memory bank 2 is additionally opened in Event 3. The bank select signal $b_2$ goes high, along with the open signal 110, causing the bank 2 register bit $Q_2$ to additionally be set. The first output circuit 116 now indicates that banks 0 and 2 are open, as well as adjacent banks 1 and 3. The output terminal 190 of the second output circuit 118 delivers a logically high signal, indicating open banks.

In Event 4, bank 1 is closed. The bank select $b_1$ now is logically high, as is the close signal 114. Thus, the AND gates 160 coupled to the reset inputs $R_0$, $R_1$ and $R_2$ each receive logically high inputs from the OR tree of the close bank circuit 112 first logic circuit 150, along with the logically high close signal 114. Therefore, the reset inputs $R_0$, $R_1$ and $R_2$ are asserted, clearing the register bits $Q_0$ and $Q_2$ associated with bank 0 and bank 2. The register bits $Q_0$–$Q_3$, associated with memory banks 0–3, are now all reset, causing the first output circuit 116, the second output circuit 118 and the third output circuit 122 to return to their initial states.

A bank state tracking mechanism 100 in accordance with the present invention is not limited to tracking the bank state of a memory device 92 having dependent bank structures. In a memory device having an independent bank organization, wherein each memory bank has a dedicated set of sense amplifiers, there is no requirement to track banks adjacent open memory banks. Therefore, when a bank state tracking mechanism 100 in accordance with the present invention is used with a memory device 92 having an independent bank structure, alternate register bits are used to track the bank state. For example, a memory device organized in an independent two bank structure would only use register bits $Q_0$ and $Q_2$. The invention may further be applied to hybrid memory devices (including both independent and dependent banks) in a similar fashion by one skilled in the art having the benefit of this disclosure.

The above description of exemplary embodiments of the invention are made by way of example and not for purposes of limitation. Many variations may be made to the embodiments and methods disclosed herein without departing from the scope and spirit of the present invention. For instance, one skilled in the art having the benefit of this disclosure could implement the various logic circuits using different combinations of discrete logic devices. The present invention is intended to be limited only by the scope and spirit of the following claims.

What is claimed is:

1. A mechanism for tracking the state of a plurality of memory banks in at least one memory device, the mechanism comprising:
   a register including a plurality of bits, each bit corresponding to one of the memory banks in the memory device;
   an open bank circuit having an output coupled to the register and being responsive to a bank select signal identifying a first one of the memory banks and an open signal to set a register bit associated with the first memory bank; and
   a close bank circuit having an output coupled to the register and being responsive to the bank select signal identifying a second one of the memory banks and a close signal to reset the register bit associated with the second memory bank and at least one bank adjacent the second memory bank.

2. The mechanism of claim 1 wherein the first and second memory banks are the same bank.

3. The mechanism of claim 1 wherein:
   the register further comprises a plurality of set inputs corresponding to the register bits for setting the register bits;
   the open bank circuit comprises a plurality of logic devices, each logic device corresponding to one of the memory banks and having an output coupled to one of the set inputs; and
   each logic device is responsive to one of the bank select signals and the open signal.

4. The mechanism of claim 3 wherein the logic devices comprise AND gates.

5. The mechanism of claim 1 wherein the register further comprises a plurality of reset inputs corresponding to the register bits for resetting the register bits; and the close bank circuit comprises:
   a first logic circuit responsive to the bank select signal and having a plurality of outputs; and
   a second logic circuit responsive to the close signal and the outputs of the first logic circuit and having a plurality of outputs coupled to the reset inputs.

6. The mechanism of claim 5 wherein the first logic circuit comprises a plurality of OR gates.

7. The mechanism of claim 5 wherein the second logic circuit comprises a plurality of AND gates.

8. The mechanism of claim 1 further comprising a first output circuit responsive to the register, the first output circuit arranged to output signals identifying any open memory banks and any memory banks adjacent the open memory banks.

9. The mechanism of claim 8 wherein the first output circuit comprises a plurality of OR gates.

10. The mechanism of claim 1 further comprising a second output circuit which indicates whether any of the memory banks are open.

11. The mechanism of claim 10 wherein the second output circuit comprises an OR gate.

12. The mechanism of claim 1 wherein the memory banks in the memory device are in a dependent organization.

13. The mechanism of claim 1 wherein at least one of the memory banks in the memory device is in an independent organization.

14. A mechanism for tracking the state of a plurality of memory banks in at least one memory device, the mechanism comprising:
   a register including a plurality of bits, each bit corresponding to one of the memory banks in the memory device;
   an open bank circuit having an output coupled to the register and being responsive to a bank select signal identifying a first one of the memory banks and an open signal to set a register bit associated with the first memory bank; and
   a first output circuit responsive to the register, the first output circuit arranged to output signals identifying the first memory bank and any memory banks adjacent the first memory bank.

15. The mechanism of claim 14 wherein the first output circuit comprises a plurality of OR gates.

16. The mechanism of claim 14 further comprising a second output circuit which indicates whether any of the memory banks are open.

17. The mechanism of claim 16 wherein the second output circuit comprises an OR gate.

18. A mechanism for tracking the state of a plurality of memory banks in a memory device, the mechanism comprising:

means for storing the identity of any open memory banks; and means for indicating the open memory banks and any memory banks adjacent any of the open memory banks.

19. The mechanism of claim 18 further comprising means for clearing the identity of a given one of the memory banks and the identities of any memory banks adjacent the given memory bank from the means for storing.

20. The mechanism of claim 18 further comprising means for indicating whether any of the memory banks are open.

21. A mechanism for tracking the state of a plurality of memory banks in a memory device, the mechanism comprising:

means for storing the identity of any open memory banks; and means for clearing the identity of a given one of the memory banks and the identities of any memory banks adjacent the given memory bank from the storage means.

22. The mechanism of claim 21 further comprising means for indicating the open memory banks and any memory banks adjacent thereto.

23. The mechanism of claim 21 further comprising means for indicating whether any of the memory banks are open.

24. A method for tracking the state of a plurality of memory banks in a memory device comprising the acts of:

setting a first bit in a register associated with a first one of the memory banks when the first memory bank is opened; and designating any memory banks adjacent the first memory bank as open.

25. The method of claim 24 further comprising the act of providing a first indication when no memory banks are open.

26. The method of claim 25 further comprising the act of providing a second indication when any of the memory banks are open.

27. The method of claim 24 further comprising the acts of:

resetting a second bit in the register associated with a second one of the memory banks; and resetting any bits in the register associated with memory banks adjacent the second memory bank.

28. The method of claim 27 wherein the first and second bits are the same bit.

29. A method for tracking the state of a plurality of memory banks in a memory device comprising the acts of:

setting a first bit in a register associated with a first one of the memory banks when the first memory bank is opened;

resetting a second bit in the register associated with a second one of the memory banks; and resetting any bits in the register associated with memory banks adjacent the second memory bank.

30. The method of claim 29 wherein the first and second bits are the same bit.

* * * * *

UNITED STATES PATENT AND TRADEMARK OFFICE
CERTIFICATE OF CORRECTION

PATENT NO.    : 6,003,111
DATED         : December 14, 1999
INVENTOR(S)   : Holman et al.

It is certified that error appears in the above-identified patent and that said Letters Patent is hereby corrected as shown below:

Column 4,
Line 5, before "includes", delete "is".

Column 5,
Line 64, after "by", delete "is".

Signed and Sealed this

Fifth Day of August, 2003

JAMES E. ROGAN
*Director of the United States Patent and Trademark Office*